US008856781B2

(12) United States Patent
Cowperthwaite et al.

(10) Patent No.: US 8,856,781 B2
(45) Date of Patent: Oct. 7, 2014

(54) METHOD AND APPARATUS FOR SUPPORTING ASSIGNMENT OF DEVICES OF VIRTUAL MACHINES

(75) Inventors: David J. Cowperthwaite, Hillsboro, OR (US); Philip R. Lantz, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 2123 days.

(21) Appl. No.: 11/521,932

(22) Filed: Sep. 14, 2006

(65) Prior Publication Data

US 2008/0072223 A1 Mar. 20, 2008

(51) Int. Cl.
G06F 9/455 (2006.01)
G06F 9/50 (2006.01)
G06F 9/44 (2006.01)
G06F 9/445 (2006.01)
G06F 9/54 (2006.01)

(52) U.S. Cl.
CPC .......... *G06F 9/45533* (2013.01); *G06F 9/5077* (2013.01); *G06F 9/4403* (2013.01); *G06F 9/44505* (2013.01); *G06F 9/545* (2013.01)
USPC .......................................................... 718/1

(58) Field of Classification Search
None
See application file for complete search history.

(56) References Cited

U.S. PATENT DOCUMENTS 5,664,139 A * 9/1997 Spurlock ...................... 711/202
6,751,679 B1 * 6/2004 Arndt et al. ...................... 710/3
6,820,164 B2 * 11/2004 Holm et al. .................... 710/312
7,475,166 B2 * 1/2009 Arndt et al. ...................... 710/23
7,543,293 B2 * 6/2009 Willman ......................... 718/100
7,725,305 B2 * 5/2010 Taillefer et al. ................. 703/23
2004/0133761 A1 * 7/2004 Goodman ....................... 711/210

OTHER PUBLICATIONS

Intel Technology Journal; vol. 10; Issue 3; Aug. 10, 2006; available at ftp://download.intel.com/technology/itj/2006/v10i3/v10-i3-art02. Pdf.
Intel(r) Virtualization Technology for Directed I/O, Architecture Specification, dated Feb. 2006, available at ftp://download.intel.com/technology/computing/vptech/Intel(r)_VT_for_Direct_IO.pdf.
U.S. Appl. No. 11/207,495, filed Aug. 19, 2006—Panesar et al.
U.S. Appl. No. 11/207,544, filed Aug. 19, 2006—Panesar et al.
U.S. Appl. No. 11/207,545, filed Aug. 19, 2006—Panesar et al.
U.S. Appl. No. 10/794,752, filed Mar. 5, 2004—Lantz et at.
U.S. Appl. No. 10/794,469, filed Mar. 5, 2004—Lantz et al.
U.S. Appl. No. 10/794,914, filed Mar. 5, 2004—Goldsmith et al.
U.S. Appl. No. 11/207,288, filed Aug. 19, 2006—Lantz et al.

* cited by examiner

*Primary Examiner* — Gregory A Kessler
(74) *Attorney, Agent, or Firm* — Caven & Aghevli LLC

(57) ABSTRACT

A processing system includes at least one processing unit, at least one bus, and at least one device on the bus. A virtual machine monitor (VMM) in the processing system determines whether a base address register (BAR) of the device specifies a barred region size of less than one page. If the BAR specifies a barred region size of less than one page, the VMM reports to a virtual machine (VM) in the processing system, on behalf of the device, that the BAR specifies a barred region size of at least one page. In one embodiment, the bus comprises a peripheral component interconnect (PCI) bus, such as a PCI Express (PCIe) bus or a PCI Extended (PCI-X) bus. The device may be a video controller, a network interface controller (NIC), or any other suitable device. Other embodiments are described and claimed.

24 Claims, 3 Drawing Sheets

METHOD AND APPARATUS FOR SUPPORTING ASSIGNMENT OF DEVICES OF VIRTUAL MACHINES

FIELD OF THE INVENTION

The present disclosure relates generally to the field of data processing, and more particularly to methods and related apparatus to support the assignment of devices to virtual machines.

BACKGROUND

A conventional processing system may include hardware resources, such as a central processing unit (CPU) and random access memory (RAM), as well as software resources, such as an operating system (OS) and one or more applications or end-user programs. An application is typically developed to run on a particular OS. The OS typically serves as an intermediary between software applications and the hardware in a processing system. In effect, the OS provides an environment within which the applications can execute.

In addition, it is sometimes possible to partition the hardware resources of a processing system into two or more independent processing environments. The independent environments may be referred to as virtual machines (VMs). Each VM in a processing system may get a different instance of the same OS, or the different VMs may get different types of OSs. An OS running in a VM may be referred to as a guest OS. The VMs may be managed by virtualization products such as a virtual machine monitor (VMM), a hypervisor, or any other suitable component or components (referenced herein generally as a VMM).

A VMM may serve as an intermediary between the OS and the hardware in the processing system. For instance, a processing system may have two VMs and a single network interface controller (NIC), and the OS in each VM may include a device driver for communicating with NICs. The VMM may provide a low level interface (referred to herein as a device model) for input and/or output (I/O) between the NIC and the device drivers in the OS. The device model may allow both VMs to use the same NIC without either OS being aware that the NIC is being shared. When the VMM serves as an intermediary between a VM and a hardware device, the VMM is said to be acting as a proxy for that hardware device.

However, in some circumstances, rather than interposing the VMM between the VM and the hardware device, it may be better to allow the VM to access the device directly.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
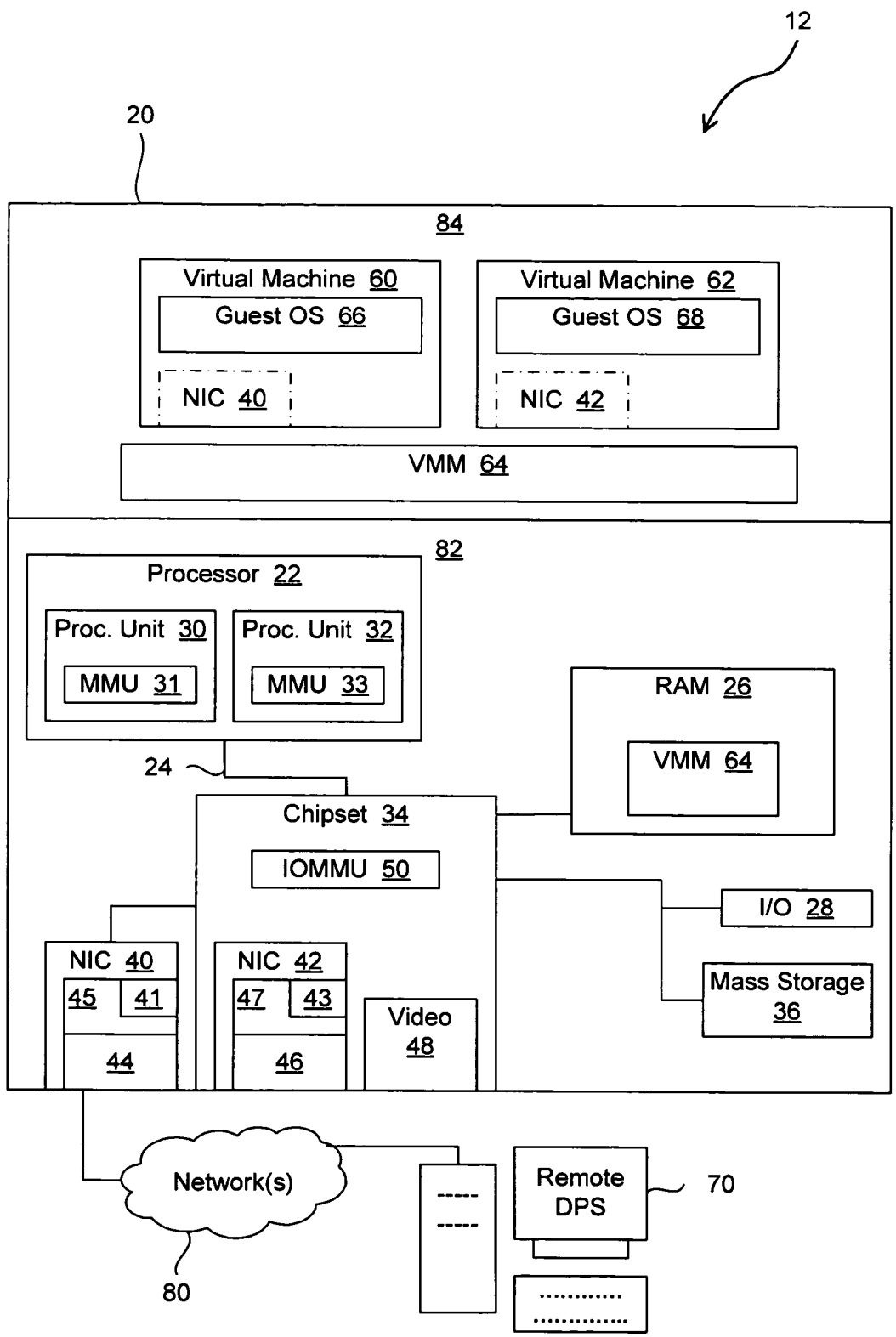
FIG. 1 is a block diagram depicting a suitable data processing environment in which certain aspects of an example embodiment of the present invention may be implemented.

Intel® Virtualization Technology for Directed I/O is a technology that supports the direct assignment of physical devices in the platform to a guest VM with relatively little subsequent intervention from a VMM. One significant aspect of this capability is allowing the guest software in the VM to configure its devices and manage its own view of the peripheral component interconnect (PCI) configuration space. For purposes of this disclosure, the term "PCI" is used in a generic sense, to include devices, expansion buses, etc. which comply with any of the various PCI-based specifications, including PCI Extended (PCI-X), PCI Express (PCIe), and any similar buses, devices, etc., whether currently existing or to be developed. Additional details may be found in the Intel®. Virtualization Technology for Directed I/O Architecture Specification, dated February 2006, available on the Internet.

With regard to memory, a VMM may provide virtualized physical memory for each VM. This virtualized physical memory should not be confused with the virtual memory that the OS in each VM may create, based on the virtualized physical memory. In particular, a memory management unit (MMU) may present the VMM with a host physical address (HPA) space. The HPA space defines the accessible host physical memory, and it may directly correspond to all, or almost all, of the physical RAM in the processing system, together with other storage areas within the platform, such as storage in devices such as NICs, video adapters, etc. However, the OS in each VM may not see the host physical memory (HPM), but may instead see the virtualized physical memory that is provided by the VMM. This virtualized physical memory may also be referred to as guest physical memory (GPM), since the OS in the VM operates as if the virtualized physical memory were physical memory for that the VM. The OS in the VM, in turn, uses the GPM to provide virtual memory for use by software in the VM.

Part of managing the PCI configuration space for a VM is the programming of the base address registers (BARs) for the VM's devices, to avoid overlaps in the memory regions they describe. For purposes of this disclosure, the memory regions defined by a device's BARs may be referred to as barred regions, and the size of a barred region may be referred to as the BAR region size. A barred region may provide memory space, I/O space, or any similar type of address space.

Thus, if a VM has two devices that each require a barred region of 1024 bytes (1K), the VMM should configure the BARs in those devices (a) to map the barred region of the first device to one address range from the guest physical memory, and (b) to map the barred region of the second device to a distinct address range. An OS in the VM may then use the barred regions to communicate with the devices.

When technology such as that described in the Intel® Virtualization Technology for Directed I/O Architecture Specification is employed to support the assignment of a device to a VM, the VMM maps the barred region or regions of the assigned physical device into the VM's address space. Memory mapping facilities in the processor, for instance, may be used to perform this mapping. The guest OS may then use memory-mapped I/O (MMIO) to directly read and write to the device (i.e., without intervention from the VMM).

According to some or all PCI specifications (e.g., the PCI Local Bus Specification, Revision 2.1, dated Jun. 1, 1995), barred regions are required to be sized as a power of two and naturally aligned. In addition, the OS in a VM may move a barred region within the GPM address space. In the course of movement of barred regions, the OS in the VM (the "guest OS") may probe the BARs of the devices in the PCI configuration space to detect the present location and size of the region(s) for each device. These interactions should typically be intercepted by the VMM and virtualized, in order to prevent a VM from misconfiguring the physical platform. The VMM should allow a VM to move a barred region in its own address space, but not in the physical platform's space, since any individual VM will typically not be aware of all of the devices in the platform.

Some platforms may allow barred regions to be as small as 128 bytes. However, some platforms require a minimum size of one page (e.g., 4K) for any region of host physical memory to be assigned/mapped into a VM. Also, when two separate devices with barred regions less than one page in size are assigned to a single VM, the VM could configure its virtual PCI configuration space such that the barred regions of the two devices are on the same page. However, the barred region of the physical devices may be on separate pages in the host physical memory. This would preclude mapping the barred regions to the VM, thereby precluding direct VM reads and writes to the device. Instead, VM accesses to the two devices would need to be intercepted by the VMM and routed (proxied) to the appropriate device.

According to an example embodiment of the present invention, the VMM prevents this condition from arising by causing the VM, when it is managing the PCI configuration space, to always use distinct pages of memory for barred regions for distinct physical devices. This is accomplished by presenting the guest OS with a size value for the barred region that is never less than the size of one page (e.g., 4K), even if the BAR on the physical device actually specifies a smaller barred region. This forces the VM to place the barred region alone on a single page of memory and to align it on a page boundary. The VMM may also ensure that the physical barred region is placed alone on a page of host physical memory and aligned on a page boundary, thus allowing that page to be mapped directly to the VM. In other words, the VMM may place all barred regions for all devices on the PCI bus on different pages of host physical memory.

FIG. 1 is a block diagram depicting a suitable data processing environment 12 in which certain aspects of an example embodiment of the present invention may be implemented. Data processing environment 12 includes a processing system 20 that has various hardware components 82, such as a CPU 22 communicatively coupled to various other components via one or more system buses 24 or other communication pathways or mediums. This disclosure uses the term "bus" to refer to shared communication channels, as well as point-to-point channels. CPU 22 may include one or more processing units, such as processing units 30 and 32. Alternatively, a processing system may include multiple processors, each having at least one processing unit. The processing units may be implemented as processing cores, as Hyper-Threading (HT) technology, or as any other suitable technology for executing multiple threads simultaneously or substantially simultaneously. In the example embodiment, processing unit 30 includes a memory management unit (MMU) 31, and processing unit 32 includes an MMU 33. Each MMU may include page remapping hardware to implement items such as CPU page tables for mapping the physical address space into a linear address space, for instance.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Processing system 20 may be controlled, at least in part, by input from conventional input devices, such as keyboards, mice, etc., and/or by directives received from another machine, biometric feedback, or other input sources or signals. Processing system 20 may utilize one or more connections to one or more remote data processing systems 70, such as through a NIC, a modem, or other communication ports or couplings. Processing systems may be interconnected by way of a physical and/or logical network 80, such as a local area network (LAN), a wide area network (WAN), an intranet, the Internet, etc. Communications involving network 80 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

Within processing system 20, processor 22 may be communicatively coupled to one or more volatile or non-volatile data storage devices, such as RAM 26, read-only memory (ROM), mass storage devices 36 such as integrated drive electronics (IDE) hard drives, and/or other devices or media, such as floppy disks, optical storage, tapes, flash memory, memory sticks, digital video disks, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as a video controller 48, small computer system interface (SCSI) controllers, NICs 40 and 42, universal serial bus (USB) controllers, I/O ports 28, input devices such as a keyboard and mouse, etc. Processing system 20 may also include a chipset 34 with one or more bridges or hubs for communicatively coupling various system components.

Devices and other items may be implemented as embedded controllers, using components such as programmable or non-programmable logic devices or arrays, application-specific integrated circuits (ASICs), embedded computers, smart cards, and the like. In the example embodiment, NIC 42 and video controller 48 are implemented as integrated components, as part of chipset 34, while NIC 40 is implemented on an adapter card with an interface (e.g., a PCI connector) for communicating with an expansion bus. Other configurations may be used in alternative embodiments.

In one embodiment, chipset 34 also includes a north bridge which serves as a memory controller hub and a PCI root bridge, and a south bridge which serves as an input/output (I/O) controller hub. In the example embodiment, chipset 34 also includes an I/O memory mapping unit (IOMMU) 50 that enables system software to create multiple direct memory access (DMA) protection domains. IOMMU 50 may reside in the north bridge, for instance. A DMA protection domain may represent memory allocated to a VM, or the DMA memory allocated by a guest-OS driver running in a VM or as part of the VMM itself, for instance. The north bridge may also include various integrated devices, PCIe root ports, etc.

In the example embodiment NIC 40 includes a configuration space 45 and an MMIO space 44, as well as BAR 41 within configuration space 45. Likewise, NIC 42 includes an MMIO space 46, as well as a configuration space 47 with BAR 43. In the example embodiment, VMM 64 intervenes when a VM attempts to interact with the configuration space of a device. By contrast, the MMIO space may include control registers and other storage constructs that a VM may directly access, via a barred region, after the device has been directly assigned to the VM, as described below.

The invention may be described by reference to or in conjunction with associated data including instructions, functions, procedures, data structures, application programs, etc., which, when accessed by a machine, result in the machine performing tasks or defining abstract data types or low-level hardware contexts. Different sets of such data may be considered components of a software environment 84.

In the example embodiment, processing system 20 may load VMM 64 into RAM 26 at boot time or at some later time to support one or more VMs within processing system 20. Processing system 20 may load the instructions that implement VMM 64 from ROM and/or from one or more local or remote mass storage devices, for instance. VMM 64 may be implemented through execution of software or firmware components such as a micro-kernel and a service OS. The micro-kernel may include a small nucleus of instructions for system management tasks such as instruction scheduling. The service OS may include device drivers and environment virtualization software for creating and maintaining VMs. Different VMM architectures may be used in alternative embodiments.

The example embodiment of FIG. 1 depicts VMM 64 supporting two guest execution environments: VMs 60 and 62. OS 66 may execute in VM 60, and OS 68 may execute in VM 62. Also, NIC 40 is depicted with dotted outlines within VM 60, to indicate that NIC 40 has been assigned directly to VM 60. Likewise, NIC 42 is depicted with dotted outlines within VM 62, to indicate that NIC 42 has been assigned directly to VM 62, as described in greater detail below, with regard to FIG. 2.

Figure 2:
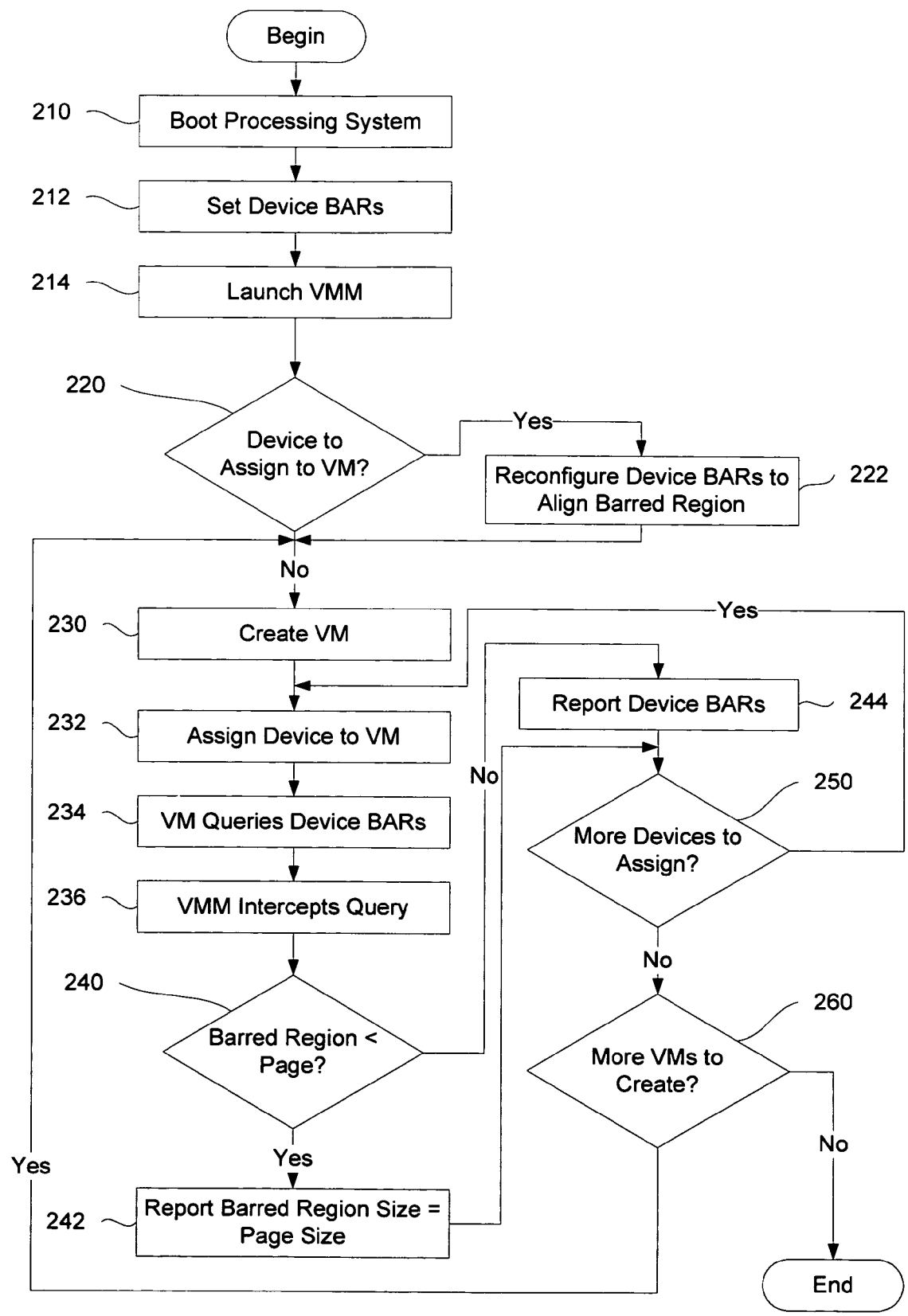
FIG. 2 is a flowchart of a process for supporting the assignment of devices to VMs according to an example embodiment of the present invention.

FIG. 2 is a flowchart of a process for supporting the assignment of devices to VMs according to an example embodiment of the present invention. The process of FIG. 2 may begin with processing system 20 being powered up or reset. At block 210, processing system may start a boot process. During that process, firmware in processing system 20 may discover the devices in processing system 20 and set the BARs for those devices to define various barred regions, as shown at block 212.

Figure 3:
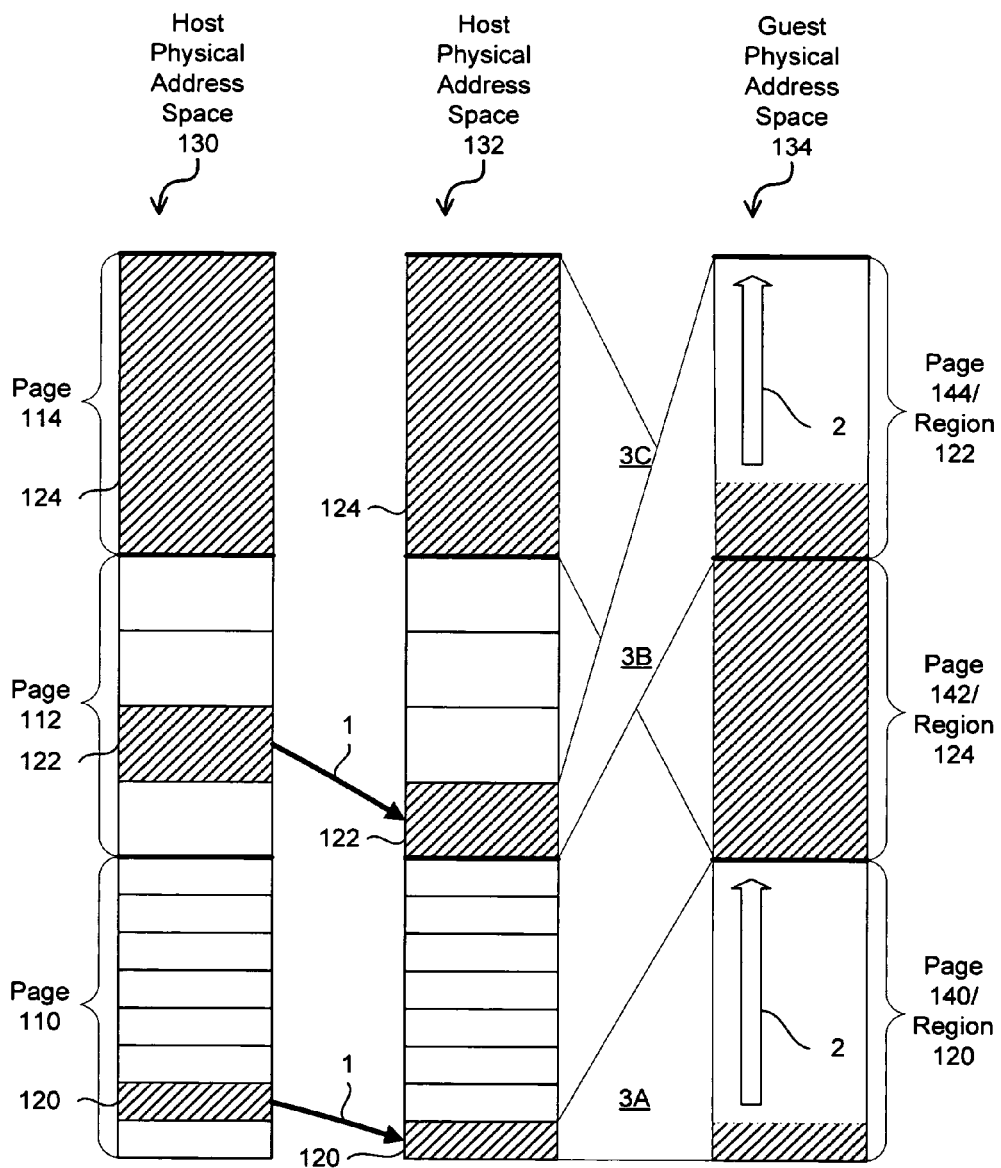
FIG. 3 is a block diagram depicting various address spaces according to an example embodiment of the present invention.

FIG. 3 is a block diagram depicting three address spaces within a processing system such as processing system 20, according to an example embodiment of the present invention. In particular, host physical address space 130 illustrates part of the HPA space, as configured by the boot process. Within HPA space 130, the firmware has defined a small (e.g., 512 byte) barred region 120 within page 110, a slightly larger (e.g., 1K) barred region 122 within page 112, and a large (e.g., 4K) barred region 124 occupying page 114. In the embodiment of FIG. 3, those barred regions correspond to three different MMIO spaces described by BARs in three different devices (e.g., NIC 40, NIC 42, and video controller 48). As illustrated, after the boot process, barred regions 120 and 122 are not aligned on a page boundary.

Referring again to FIG. 2, as part of or after the boot process, processing system 20 may launch VMM 64, as depicted at block 214. VMM 64 may then determine which devices are to be directly assigned to VMs, as shown at block 220. This determination may be made based on predefined VM configuration settings, or on user input, for instance. For each device to be assigned directly to a VM, VMM may determine whether the barred region or regions for that device are aligned on a page boundary, and may reconfigure the BARs to ensure that all of the barred regions are aligned on a page boundary, as shown at block 222. These kinds of operations are represented by arrows 1 in FIG. 3, and HPA space 132 illustrates that barred regions 120 and 122 have been aligned on a page boundary.

VMM 230 may then create a VM, as shown at block 230. VMM 230 may then assign a device to the VM, as depicted at block 232. The OS in the VM may then query the BARs in that device to determine the barred regions needed by that device, as shown at block 234. However, as indicated at block 236, VMM 64 may intercept those queries or requests and send its own query to the device. After receiving a response from the device, VMM 64 may determine whether the BARs in the device specify a barred region to occupy less than one page, as shown at block 240. If the device BARs describe a barred region of one page or more, VMM 64 may simply forward the device BAR data to the VM, as depicted at block 244. However, if the device BARs describe a barred region of less than one page, VMM 64 may substitute a region size of at least one page in the BAR data returned to the VM, as indicated at block 242.

After returning a response to the VM for the query that the VM directed to the device, VMM 64 may determine whether there are any more devices to be assigned to the VM, as shown at block 250. If so, the process may return to block 232, with the above operations repeated as necessary for any additional devices. After VMM 64 has assigned all of the necessary devices to the VM, VMM 64 may determine whether any additional VMs should be created, as shown at block 260. If so, the process may return to block 230, and the above steps may be repeated as necessary to assign additional devices to additional VMs. Once all necessary VMs have been created and all necessary devices have been assigned to those VMs, the illustrated process may end.

Alternatively, all VMs need not be created at the same time. For instance, a processing system may shut down a VM at some point, and then subsequently create another VM. In addition, a device may be reassigned from one VM to another. For example, if a device is assigned to a VM that gets shut down, the device could then be assigned to a new VM.

Also, the process of assigning devices to VMs may not be sequential with respect to the VMs accessing the devices' BARs. For instance, a VMM may assign all necessary devices to a VM first, and the VM may then access the BARs of those devices at any suitable time and in any suitable order.

Referring again to block 242, and to FIG. 3, path 3A and arrow 2 illustrate that the VM has allocated barred region 120 with a region size of one page, occupying guest physical address page 140. The VM used that region size, based on the data from VMM 64 reporting that barred region 120 should occupy one page, even though the BARs in the physical device describe a region size of less than one page. Likewise, path 3B shows that barred region 122 occupies a full page, GPA page 144. Also, paths 3B and 3C illustrate that guest physical pages (e.g., pages 142 and 144) can be arranged in a different order than the corresponding host physical pages (e.g., pages 124 and 122, respectively). The diagonal lines within pages 140 and 144 in GPA space 134 show that the corresponding devices will only use a portion of those barred regions. A dashed line is used for the border above those diagonal lines, to illustrate that barred regions 120 and 122 each occupy a full page, even though only portions of those pages are used by the corresponding device.

By presenting the VM with artificially large BAR size values, the VMM causes the existing mechanism for managing PCI devices in the guest OS to naturally achieve the desired result: a single virtual BAR region per page, aligned at the start of the page. This result supports the direct mapping of the device's MMIO region to the VM, which allows the guest to have direct access to the barred region without the overhead of proxying by the VMM.

By contrast, if the VMM were to allow a guest OS to assign barred regions to arbitrary locations in memory, the barred regions might not align on a page boundary. If a barred region is not aligned on a page boundary, or if the guest locates more than one barred region within a single page, the VMM may need to proxy all MMIO accesses to the affected devices. Proxy by the VMM may impose a large performance penalty, compared to direct MMIO access.

In one embodiment, if a device driver in a VM is incompatible with the method described above, the VMM may serve as a proxy between the VM and the device, instead of directly assigning the device to the VM. For instance, a device driver may be considered incompatible if (a) the driver expects a barred region to be less than a page, and (b) the driver would not operate correctly if the VMM were to virtualize the BAR to indicate a page-sized barred region.

In light of the principles and example embodiments described and illustrated herein, it will be recognized that the illustrated embodiments can be modified in arrangement and detail without departing from such principles. For instance, FIG. 2 describes a VMM that aligns barred regions in host physical memory during initialization. However, in other embodiments, VMMs may align barred regions at other times, such as when assigning devices to VMs.

Also, the foregoing discussion has focused on particular embodiments, but other configurations are contemplated. For instance, the embodiment of FIG. 1 involves NICs assigned to VMs, but any device that uses BARs may be assigned to a VM in other embodiments. The types of devices that may be assigned to VMs include, without limitation, USB controllers, modems, serial ports, Bluetooth controllers, mouse controllers, mass storage controllers, SCSI controllers, smart card readers, sound cards, etc.

Also, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine-accessible media encoding instructions for performing the operations of the invention. Such embodiments may also be referred to as program products. Such machine-accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method comprising:
    determining, at a processor, that a device on a bus in a processing system has a base address register (BAR) which specifies a barred region size of less than one page; and
    reporting, on behalf of the device by a virtual machine monitor (VMM), to a virtual machine (VM) in the processing system, that the BAR specifies a barred region size of at least one page, wherein a guest operating system is to directly read from and write to the device based on memory-mapped input/output (MMIO) and without any intervention from the VMM, wherein the VMM allows the VM to move a barred region in an address space of the VM but not in a physical space of the processing system.

2. A method according to claim 1, wherein the bus comprises a communication channel selected from the group consisting of:
    a peripheral component interconnect (PCI) bus;
    a PCI Express (PCIe) bus; and
    a PCI Extended (PCI-X) bus.

3. A method according to claim 1, wherein the device comprises a hardware device from the group consisting of:
    a video controller;
    a network interface controller (NIC);
    a universal serial bus (USB) controller;
    a mass storage controller; and
    a small computer system interface (SCSI) controller.

4. A method according to claim 1, further comprising:
    intercepting, at the virtual machine monitor (VMM), a query from the VM to the device, the query requesting BAR data from the device.

5. A method according to claim 1, wherein the operation of reporting that the BAR specifies a barred region size of at least one page comprises:
    reporting that the BAR specifies the barred region size to be at least 4096 bytes (4K).

6. A method according to claim 1, further comprising:
    configuring device BARs to place all barred regions for all devices on the bus on different pages of host physical memory.

7. The method of claim 1, further comprising the VMM mapping a barred region of the device into an address space of the VM.

8. The method of claim 1, further comprising the VM causing placement of a plurality of barred regions of a plurality of devices on the bus, including the device and another device, on the same memory page.

9. The method of claim 8, wherein the plurality of the devices are assigned to the VM.

10. A method comprising:
   determining whether a device on a bus in a processing system has a base address register (BAR) which specifies a barred region that will not be page aligned; and
   updating the BAR, at a virtual machine monitor (VMM), to specify the barred region to be page aligned if the BAR specifies a barred region that will not be page aligned, wherein a guest operating system is to directly read from and write to the device based on memory-mapped input/output (MMIO) and without any intervention from the VMM, wherein the VMM allows a virtual machine (VM) to move a barred region in an address space of the VM but not in a physical space of the processing system.

11. A method according to claim 10, further comprising:
   configuring device BARs to place all barred regions for all devices on the bus on different pages of host physical memory.

12. An apparatus comprising:
   a non-transitory machine-accessible medium; and
   instructions in the machine-accessible, wherein the instructions, when executed by a processing system, cause the processing system to perform operations comprising:
   determining that a device on a bus in the processing system has a base address register (BAR) which specifies a barred region size of less than one page; and
   reporting, on behalf of the device by a virtual machine monitor (VMM), to a virtual machine (VM) in the processing system, that the BAR specifies a barred region size of at least one page, wherein a guest operating system is to directly read from and write to the device based on memory-mapped input/output (MMIO) and without any intervention from the VMM, wherein the VMM is to allow the VM to move a barred region in an address space of the VM but not in a physical space of the processing system.

13. An apparatus according to claim 12, wherein the bus comprises a communication channel selected from the group consisting of:
   a peripheral component interconnect (PCI) bus;
   a PCI Express (PCIe) bus; and
   a PCI Extended (PCI-X) bus.

14. An apparatus according to claim 12, wherein the device comprises a hardware device from the group consisting of:
   a video controller;
   a network interface controller (NIC);
   a universal serial bus (USB) controller;
   a mass storage controller; and
   a small computer system interface (SCSI) controller.

15. An apparatus according to claim 12, wherein the instructions further cause the processing system the perform operations comprising:
   if the BAR of the device specifies a barred region that will not be page aligned, updating the BAR to specify the barred region to be page aligned.

16. An apparatus according to claim 12, wherein the instructions, when executed, implement the virtual machine monitor (VMM) to intercept a query from the VM to the device, the query requesting BAR data from the device.

17. An apparatus according to claim 12, wherein the operation of reporting that the BAR specifies a barred region size of at least one page comprises:
   reporting that the BAR specifies the barred region size to be at least 4096 bytes (4K).

18. An apparatus according to claim 12, wherein the instructions further cause the processing system the perform operations comprising:
   configuring device BARs to place all barred regions for all devices on the bus on different pages of host physical memory.

19. A system comprising:
   a processing unit;
   a bus responsive to the processing unit;
   a device responsive to the processing unit via the bus;
   a base address register (BAR) in the device;
   a virtual machine (VM); and
   a virtual machine monitor (VMM) to report, on behalf of the device, to the VM, that the BAR specifies a barred region size of at least one page, wherein a guest operating system is to directly read from and write to the device based on memory-mapped input/output (MMIO) and without any intervention from the VMM, wherein the VMM allows the VM to move a barred region in an address space of the VM but not in a physical space of the processing system.

20. A system according to claim 19, wherein the bus comprises a communication channel selected from the group consisting of:
   a peripheral component interconnect (PCI) bus;
   a PCI Express (PCIe) bus; and
   a PCI Extended (PCI-X) bus.

21. A system according to claim 19, wherein the device comprises a hardware device from the group consisting of:
   a video controller;
   a network interface controller (NIC);
   a universal serial bus (USB) controller;
   a mass storage controller; and
   a small computer system interface (SCSI) controller.

22. A system according to claim 19, further comprising:
   control logic in the VMM to determine whether the BAR of the device specifies a barred region that will not be page aligned, and to update the BAR to specify the barred region to be page aligned if the BAR specifies a barred region that will not be page aligned.

23. A system according to claim 19, further comprising:
   control logic in the VMM to intercept a query from the VM to the device, the query requesting BAR data from the device.

24. A system according to claim 19, further comprising:
   control logic in the VMM to configure device BARs to place all barred regions for all devices on the bus on different pages of host physical memory.

* * * * *